(12) United States Patent
Su et al.

(10) Patent No.: US 12,078,864 B2
(45) Date of Patent: *Sep. 3, 2024

(54) LENS DRIVING MODULE AND ELECTRONIC DEVICE

(71) Applicant: LARGAN DIGITAL CO., LTD., Taichung (TW)

(72) Inventors: Heng Yi Su, Taichung (TW); Ming-Ta Chou, Taichung (TW); Te-Sheng Tseng, Taichung (TW); Ming-Shun Chang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,930

(22) Filed: Dec. 8, 2022

(65) Prior Publication Data

US 2023/0103646 A1  Apr. 6, 2023

Related U.S. Application Data

(63) Continuation of application No. 16/988,637, filed on Aug. 8, 2020, now Pat. No. 11,550,116.

(30) Foreign Application Priority Data

May 20, 2020 (TW) ................................ 109116644

(51) Int. Cl.
*G02B 7/04* (2021.01)
*G02B 27/64* (2006.01)

(52) U.S. Cl.
CPC ............. *G02B 7/04* (2013.01); *G02B 27/646* (2013.01)

(58) Field of Classification Search
CPC ... G02B 7/04; G02B 7/08; G02B 7/09; G02B 27/646; G03B 5/00; G03B 13/36; G03B 17/12

(Continued)

(56) References Cited

U.S. PATENT DOCUMENTS 5,208,703 A * 5/1993 Ikegame .............. G11B 7/0935
359/813
7,158,316 B2   1/2007 Chang et al.
(Continued)

FOREIGN PATENT DOCUMENTS

CN   105022203 A   11/2015
CN   106066525 A   11/2016

*Primary Examiner* — William R Alexander
(74) *Attorney, Agent, or Firm* — Maschoff Brennan

(57) ABSTRACT

A lens driving module includes a base, a shield can, a driving mechanism, a space maintaining element and a damping element. The base has an opening. The shield can is coupled to the base and has a central aperture corresponding to the opening. The driving mechanism is disposed in the shield and configured to drive a lens unit to move. The space maintaining element is in physical contact with the shield can. The space maintaining element includes a plastic frame portion and a metal structure portion. The metal structure portion includes pins extending toward the base. The metal structure portion is insert-molded with the plastic frame portion to form the space maintaining element. The damping element is connected to the pins and the lens unit. The pins of the metal structure portion are located closer to the optical axis than part of the metal structure portion without the pins.

19 Claims, 16 Drawing Sheets

(58) Field of Classification Search
USPC .......................................................... 359/557
See application file for complete search history.

(56) References Cited

U.S. PATENT DOCUMENTS

| | | |
|---|---|---|
| 7,590,342 B2 | 9/2009 | Wu et al. |
| 8,066,440 B2 | 11/2011 | Baik et al. |
| 8,379,337 B2 | 2/2013 | Wade et al. |
| 8,611,735 B2 | 12/2013 | Sekimoto |
| 8,749,645 B2 | 6/2014 | Wu et al. |
| 8,823,815 B1 | 9/2014 | Sekimoto |
| 9,195,026 B1 | 11/2015 | Chen et al. |
| 9,294,661 B2 | 3/2016 | Choi et al. |
| 9,575,329 B2 | 2/2017 | Kim et al. |
| 9,762,785 B2 | 9/2017 | Kim et al. |
| 9,848,126 B2 | 12/2017 | Kang et al. |
| 9,857,555 B2 | 1/2018 | Lee et al. |
| 10,139,586 B2 | 11/2018 | Chan |
| 10,345,614 B2 | 7/2019 | Ichihashi |
| 10,663,689 B2 | 5/2020 | Lee et al. |
| 2008/0129830 A1* | 6/2008 | Inoue ........................ G03B 5/00 348/208.2 |
| 2018/0180838 A1* | 6/2018 | Wu ........................... G02B 7/09 |
| 2019/0137780 A1* | 5/2019 | Arai ..................... H04N 23/687 |
| 2019/0327397 A1* | 10/2019 | Tseng ..................... H04N 23/55 |
| 2019/0364181 A1* | 11/2019 | Tseng ........................ G02B 7/08 |
| 2020/0150381 A1* | 5/2020 | Yu ............................. G02B 7/08 |
| 2020/0209711 A1* | 7/2020 | Tseng ..................... H04N 23/57 |

* cited by examiner

LENS DRIVING MODULE AND ELECTRONIC DEVICE

RELATED APPLICATIONS

This application is a continuation patent application of U.S. application Ser. No. 16/988,637 filed on Aug. 8, 2020, which claims priority to Taiwan Application 109116644, filed on May 20, 2020, which is incorporated by reference herein in its entirety.

BACKGROUND

Technical Field

The present disclosure relates to a lens driving module, more particularly to a lens driving module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

A conventional lens assembly usually includes a lens barrel and a lens carrier assembled together by their thread structures. The position of the lens barrel with respect to the lens carrier is adjustable by rotating the lens barrel so as to focus images onto the image surface of the image sensor. However, the design requirements of thread structures may inevitably increase the size of the lens assembly and the assembling complexity. Furthermore, many conventional lens assemblies on the market usually have a voice coil motor (VCM) as a camera driver module for auto focus, and this kind of camera driver module usually consists of several components. For the requirements of accuracy and smoothness of movement of the lens unit, multiple alignment and calibration steps are needed during the assembly process of the camera driver module and the lens unit itself in order to complete the assembly of those components accurately. As a result, the manufacturing efficiency and yield rate of the camera driver module are therefore influenced.

Accordingly, how to improve the camera driver module for increasing yield rate so as to meet the requirement of high-end-specification electronic devices is an important topic in this field nowadays.

SUMMARY

According to one aspect of the present disclosure, a lens driving module includes a base, a shield can, a driving mechanism, a space maintaining element and a damping element. The base has an opening. The shield can is coupled to the base, and the shield can has a central aperture corresponding to the opening of the base. The driving mechanism is disposed in the shield can, and the driving mechanism is configured to drive a lens unit to move in a direction parallel to an optical axis. The space maintaining element is in physical contact with the shield can. The space maintaining element is configured to space the driving mechanism apart from the central aperture of the shield can by a predetermined distance in the direction parallel to the optical axis. The space maintaining element includes a plastic frame portion and a metal structure portion. The metal structure portion includes a plurality of pins extending toward the base, and the metal structure portion is insert-molded with the plastic frame portion to form the space maintaining element. The damping element is connected to the plurality of pins and the lens unit. The plurality of pins are located closer to the optical axis than part of the metal structure portion without the plurality of pins.

According to another aspect of the present disclosure, an electronic device includes the aforementioned lens driving module.

According to another aspect of the present disclosure, a lens driving module includes a base, a shield can, a driving mechanism and a space maintaining element. The base has an opening. The shield can is coupled to the base, and the shield can has a central aperture corresponding to the opening of the base. The driving mechanism is disposed in the shield can, and the driving mechanism is configured to drive a lens unit to move in a direction parallel to an optical axis. The space maintaining element is in physical contact with the shield can, and the space maintaining element is configured to space the driving mechanism apart from the central aperture of the shield can by a predetermined distance in the direction parallel to the optical axis. The space maintaining element includes a plastic frame portion and a bump structure. The plastic frame portion is in direct contact with the shield can. The bump structure extends toward the base. The driving mechanism includes at least one magnet, at least one coil and a lower elastic element. The at least one coil corresponds to the at least one magnet. The lens unit is movable in the direction parallel to the optical axis by a magnetic force generated by an interaction between the at least one magnet and the at least one coil. One of the at least one magnet and the at least one coil is disposed on the lens unit. The lower elastic element is coupled to the lens unit. The lower elastic element is disposed on an image side of the lens unit and includes an extension portion extending away from the optical axis in a direction perpendicular to the optical axis. The bump structure of the space maintaining element corresponds to the extension portion of the lower elastic element, and the bump structure and the at least one magnet are alternatively disposed in a circumferential direction surrounding the optical axis.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
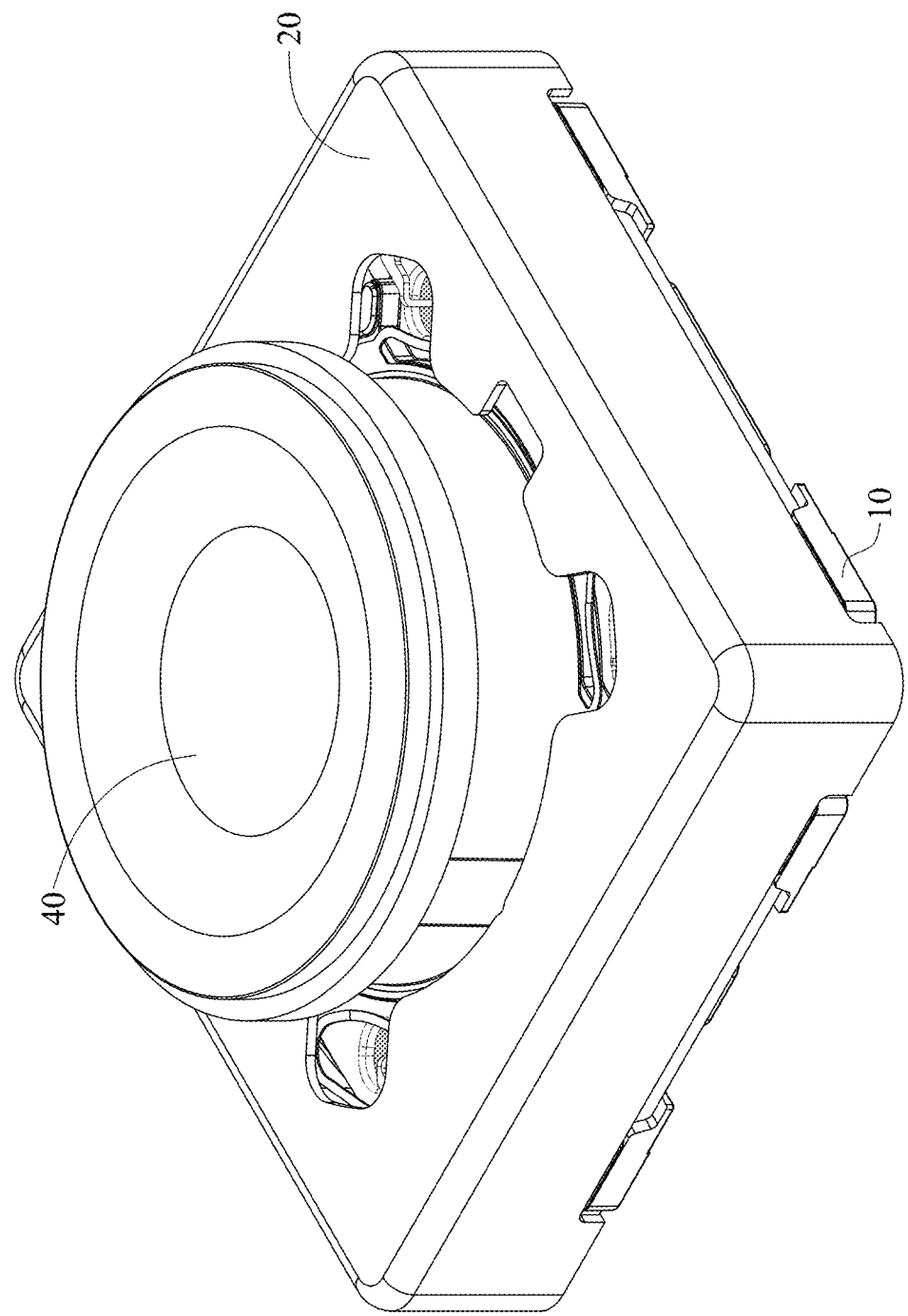
FIG. 1 is a perspective view of a lens driving module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a lens driving module which includes a base, a shield can, a driving mechanism and a space maintaining element. The base has an opening. The shield can is coupled to the base, and the shield can has a central aperture corresponding to the opening of the base. The driving mechanism is disposed in the shield can, and the driving mechanism is configured to drive a lens unit to move in a direction parallel to an optical axis. The space maintaining element is in physical contact with the shield can, and the space maintaining element is configured to space the driving mechanism apart from the central aperture of the shield can by a predetermined distance in the direction parallel to the optical axis.

According to the lens driving module in the present disclosure, the space maintaining element can include a plastic frame portion and a metal structure portion. The metal structure portion can be an elastically deformable sheet of metal material, but the present disclosure is not limited thereto. The metal structure portion includes a plurality of pins extending toward the base; in this case, the metal structure portion is insert-molded with the plastic frame portion to form the space maintaining element. In addition to the pins, the metal structure portion further includes one or more other parts (e.g., connection arms connected between the pins and the plastic frame portion, or a main portion attached on the surface of the plastic frame portion), and the pins are located closer to the optical axis than said other parts. Therefore, the insert-molding process for manufacturing the space maintaining element is favorable for reducing assembly tolerance between the plastic frame portion and the metal structure portion. In addition, the plastic frame portion of the space maintaining element features good filling manufacturability, and the material characteristics of the plastic frame portion and the metal structure portion can match the mold so as to increase the product design flexibility. Furthermore, the proper rigidity of the metal structure portion made of suitable material (e.g., a material including iron) is favorable for reducing the complexity of injection molding.

The lens driving module disclosed in the present disclosure can further include a damping element which is connected to the metal pins of the space maintaining element and the lens unit. The metal pins can be in arbitrary shape and collaborate with the damping element to generate a proper viscosity coefficient. The damping element provides cushion effect to absorb an over impact force, which is favorable for increasing the focus stability of the lens driving module and preventing image shake. The damping element can be a high viscosity damping agent, but the present disclosure is not limited thereto.

According to the lens driving module in the present disclosure, the driving mechanism can include at least one magnet, at least one coil and at least one elastic element. The coil and the magnet correspond to each other. The elastic element is coupled to the lens unit. One of the magnet and the coil is disposed on the lens unit. The lens unit is able to move in the direction parallel to the optical axis by a magnetic force generated by an interaction (a Lorentz force generated by an electromagnetic interaction) between the magnet and the coil. Therefore, it is favorable for the driving mechanism to have a proper space arrangement so as to optimize the driving efficiency of the electromagnetic force.

The number of the elastic element of the driving mechanism is two. In detail, the driving mechanism can include an upper elastic element and a lower elastic element disposed opposite to each other. The upper elastic element is disposed on an object side of the lens unit, and the lower elastic element is disposed on an image side of the lens unit. The two elastic elements can define a driving movement range of the driving mechanism.

The lower elastic element of the driving mechanism can include an extension portion extending away from the optical axis in a direction perpendicular to the optical axis. The extension portion is favorable for cushioning impact energy when being in physical contact with the space maintaining element, such that the driving mechanism reaches the limit value of the driving movement range.

The coil of the driving mechanism and the extension portion of the lower elastic element can be alternatively disposed in a circumferential direction surrounding the optical axis. Therefore, it is favorable for improving the space utilization of the lens driving module.

According to the lens driving module in the present disclosure, the space maintaining element can further include at least one bump structure disposed on an image-side surface of the plastic frame portion. The bump structure extends toward the base and corresponds to the extension portion of the lower elastic element. The bump structure and the extension portion of the lower elastic element can together constitute a stopper mechanism of the lens driving module so as to restrict movement of the driving mechanism in the direction parallel to the optical axis. When the bump structure and the extension portion collide with each other, they can eliminate the impact energy generated during focusing. Therefore, the bump structure is favorable for reducing the contact area of the space maintaining element with the extension portion, which helps to eliminate the abnormal noise generated when the driving mechanism collides with the space maintaining element. As such, the lens driving module is relatively quiet during operation, thereby improving the operation delicacy of the lens driving module.

According to the lens driving module in the present disclosure, the bump structure of the space maintaining element and the extension portion of the lower elastic element are overlapped with each other in the direction parallel to the optical axis. Therefore, it is favorable for the space maintaining element to shield the stray light reflected by the lower elastic element, thereby preventing non-imaging light from entering the lens unit.

According to the lens driving module in the present disclosure, the plastic frame portion and the bump structure of the space maintaining element can be made in one-piece.

Therefore, it is favorable for the bump structure to be accurately positioned in the lens driving module, thereby reducing assembly tolerance.

According to the lens driving module in the present disclosure, the bump structure of the space maintaining element and the magnet of the driving mechanism can be alternatively disposed in the circumferential direction surrounding the optical axis. Therefore, when the driving mechanism moves, any part of the driving mechanism except the lower elastic element can be prevented from hitting the space maintaining element, thereby improving the effect of the stopper mechanism to eliminate abnormal noise.

According to the lens driving module in the present disclosure, the shield can may further include an expansion portion connected to the central aperture and extending away from the central aperture. The lens unit includes a notch structure extending toward the base. The notch structure and the expansion portion correspond to each other. The notch structure is exposed to the object side of the lens unit by the expansion portion. That is, as the lens unit is viewed from its object side toward the image side, the notch structure is visible via the expansion portion. Therefore, it is favorable for adjusting the steps of additionally installing the damping element according to process requirements, thereby preventing unnecessary waste of process resources. The damping element can be disposed in the notch structure for usage requirement, and the damping element is connected to the pins of the space maintaining element to improve image quality.

According to the space maintaining element of the lens driving module in the present disclosure, when a height of the plastic frame portion in the direction parallel to the optical axis is Hb, and a height of the metal structure portion in the direction parallel to the optical axis is Hp, the following condition can be satisfied: Hp<Hb. Therefore, it is favorable for designing the mold of insert-molding.

According to the driving mechanism of the lens driving module in the present disclosure, when the height of the plastic frame portion in the direction parallel to the optical axis is Hb, and a height of the magnet in the direction parallel to the optical axis is Hm, the following condition can be satisfied: 0.7<Hb/Hm<1.3. Therefore, it is favorable for obtaining a balance between maintaining sufficient magnetic field range of the magnet and the cushion degree of the bump structure.

According to the lens driving module in the present disclosure, the plastic frame portion of the space maintaining element can include a connection surface and a step surface. The connection surface is located on an object-side surface of the plastic frame portion, and the connection surface is connected to and in physical contact with the shield can. The step surface is located closer to the base than the connection surface, and part of the metal structure portion located in an area of the step surface is exposed to air. Therefore, it is favorable for designing the geometric configuration of the insert-molding mold and reducing the complexity of plastic molding design.

According to the lens driving module in the present disclosure, the plastic frame portion of the space maintaining element can include at least one gate trace located on the step surface. Therefore, it is favorable for providing the accommodation space for the gate trace of plastic molding and preventing the cutting surface of the gate trace from interfering with other mechanism.

According to the lens driving module in the present disclosure, the pins included by the metal structure portion of the space maintaining element can be in contact with the damping element, but not in direct contact with the lens unit. The distal ends of the pins of the metal structure portion can be in arbitrary polygons structures such as flat sheets, spheres and pyramids, but the present disclosure is not limited thereto. The pins of the metal structure portion with arbitrary polygons structure design can provide different cushion effect.

According to the present disclosure, the aforementioned features and conditions can be utilized in numerous combinations so as to achieve corresponding effects.

The present disclosure provides an electronic device which includes the aforementioned lens driving module. By restricting an ideal height positon of the driving mechanism in the direction parallel to the optical axis through the space maintaining element, it is favorable for more accurately controlling the focus performance of the lens of the electronic device.

According to the above description of the present disclosure, the following specific embodiments are provided for further explanation.

1st Embodiment

Figure 2:
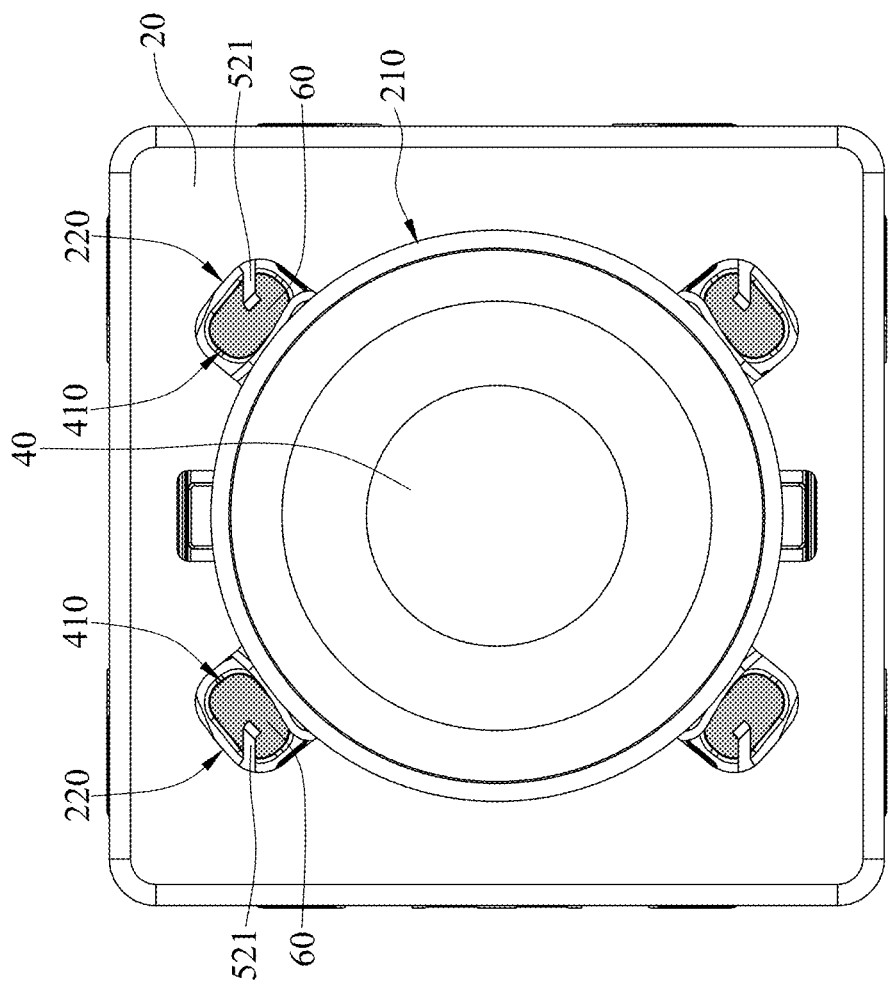
FIG. 2 is a top view of the lens driving module in FIG. 1.
Figure 3:
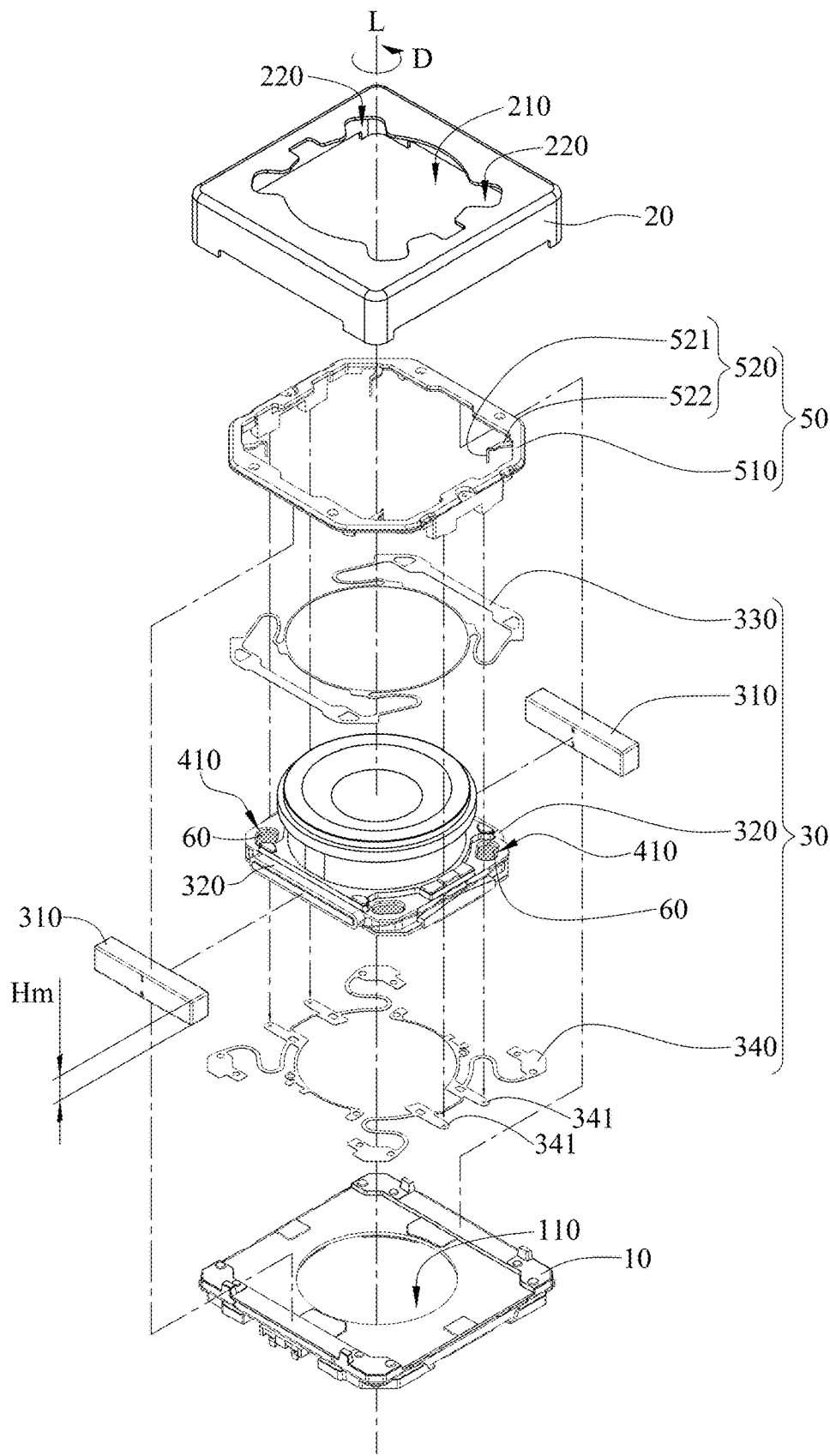
FIG. 3 and FIG. 4 are exploded views of the lens driving module in FIG. 1.
Figure 4:
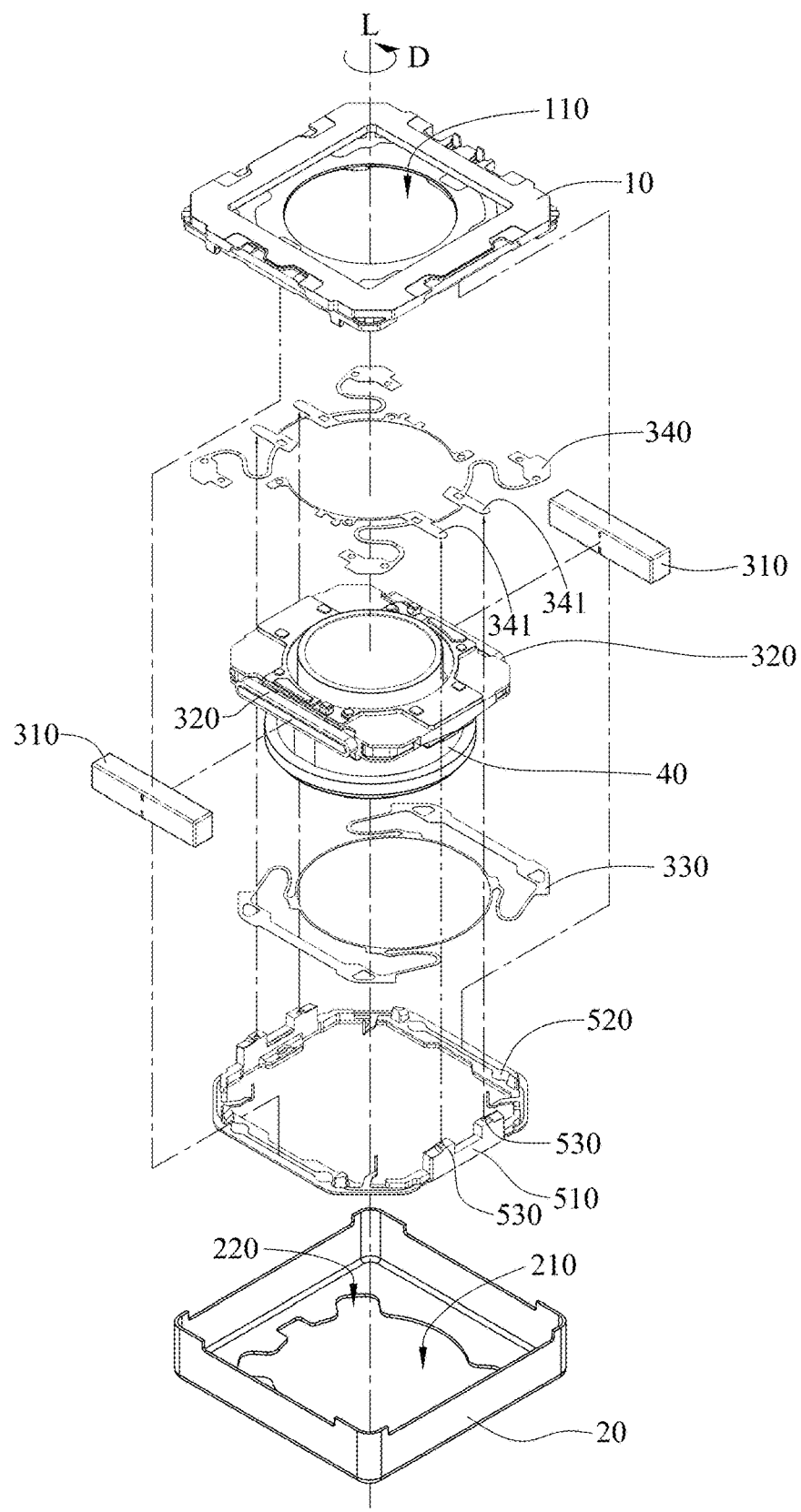

Please refer to FIG. 1 to FIG. 4, where FIG. 1 is a perspective view of a lens driving module according to the 1st embodiment of the present disclosure, FIG. 2 is a top view of the lens driving module in FIG. 1, and FIG. 3 and FIG. 4 are exploded views of the lens driving module in FIG. 1. In this embodiment, a lens driving module 1 includes a base 10, a shield can 20, a driving mechanism 30, a lens unit 40, a space maintaining element 50 and damping elements 60.

The base 10 has an opening 110. The shield can 20 is coupled to the base 10. The shield can 20 has a central aperture 210 corresponding to the opening 110 of the base 10. The shield can 20 further includes expansion portions 220 connected to the central aperture 210, and the expansion portions 220 extend away from the central aperture 210.

The driving mechanism 30 is disposed in the shield can 20 and is able to drive the lens unit 40 to move in a direction parallel to an optical axis L. In detail, the driving mechanism 30 includes a plurality of magnets 310, a plurality of coils 320, an upper elastic element 330 and a lower elastic element 340. The coils 320 and the magnets 310 correspond to each other. Specifically, the coils 320 are disposed on the lens unit 40, and the magnets 310 are disposed around the coils 320. The lens unit 40 is able to move in the direction parallel to the optical axis L by a magnetic force generated by an interaction between the magnets 310 and the coils 320. The upper elastic element 330 and the lower elastic element 340 are coupled to the lens unit 40. The upper elastic element 330 is disposed on an object side of the lens unit 40, and the lower elastic element 340 is disposed on an image side of the lens unit 40. The upper elastic element 330 and the lower elastic element 340 can define a driving movement range of the driving mechanism 30.

The space maintaining element 50 is in physical contact with the shield can 20, and the space maintaining element 50 spaces the driving mechanism 30 apart from the central aperture 210 of the shield can 20 by a predetermined distance in the direction parallel to the optical axis L. In detail, the space maintaining element 50 includes a plastic frame portion 510 and a metal structure portion 520. The metal structure portion 520 includes pins 521 extending toward the base 10 and connection arms 522 connected to the plastic frame portion 510. The pins 521 is located closer to the optical axis L than the connection arms 522, and the distal ends of the pins 521 are square columns. In this embodiment, the metal structure portion 520 is insert-molded with the plastic frame portion 510 to form the space maintaining element 50.

Figure 5:
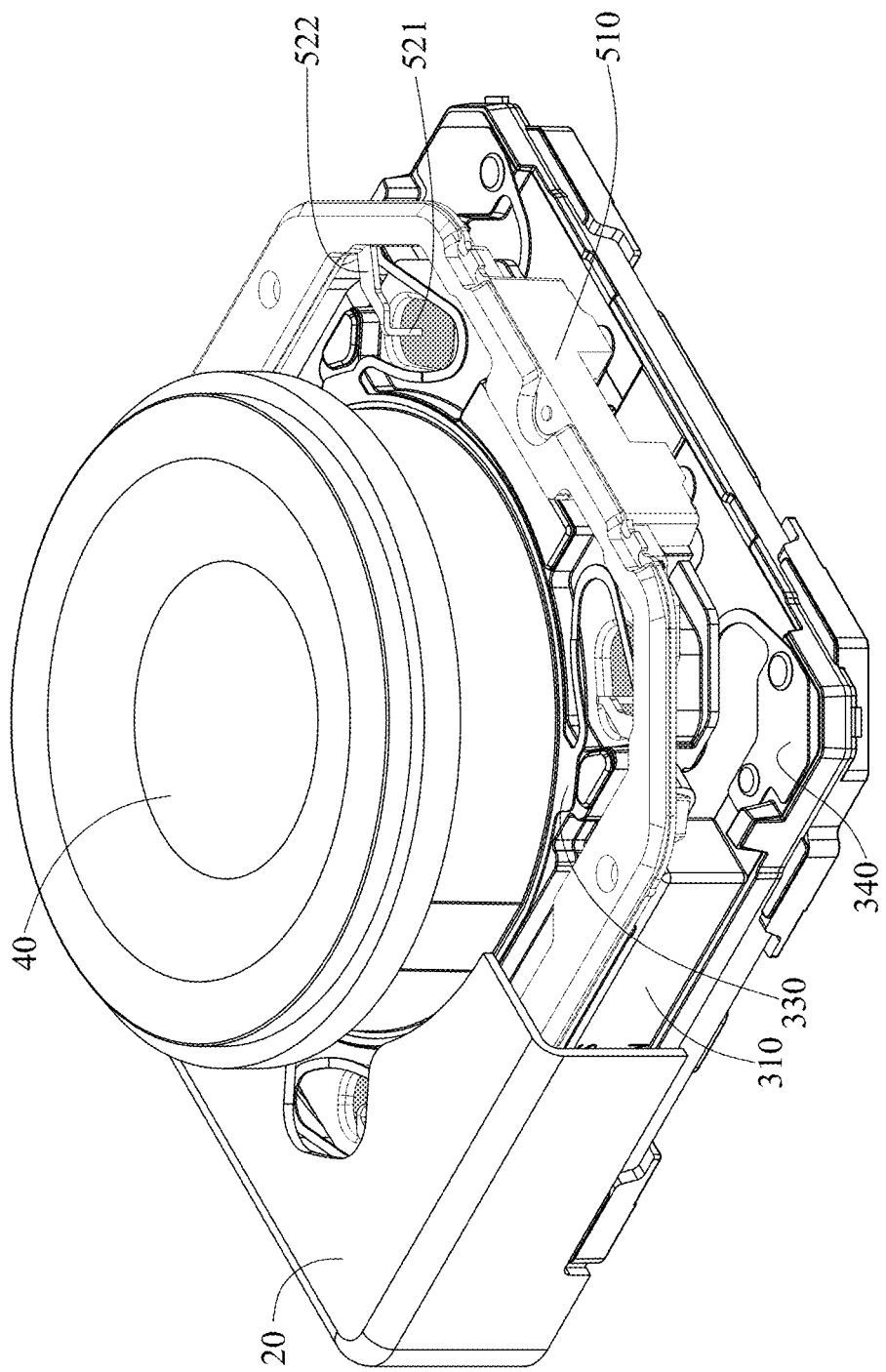
FIG. 5 is a partially sectioned view of the lens driving module in FIG. 3.
Figure 6:
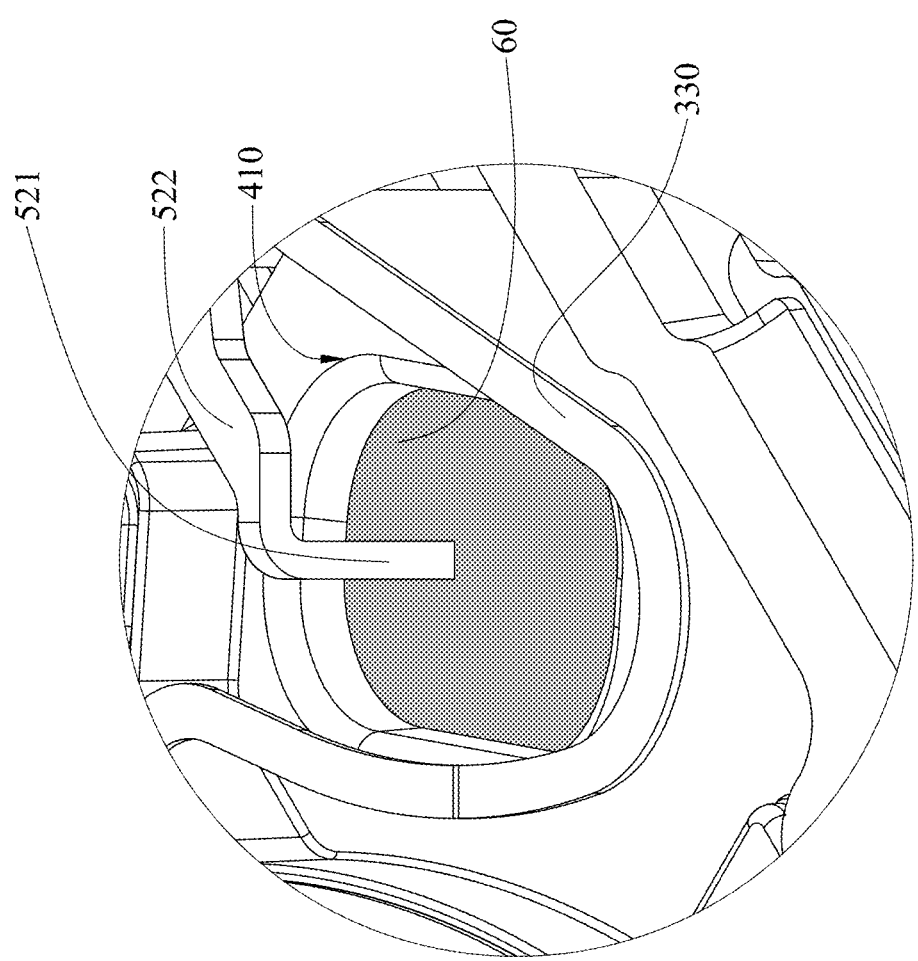
FIG. 6 to FIG. 8 are partially enlarged views of the lens driving module in FIG. 5.
Figure 7:
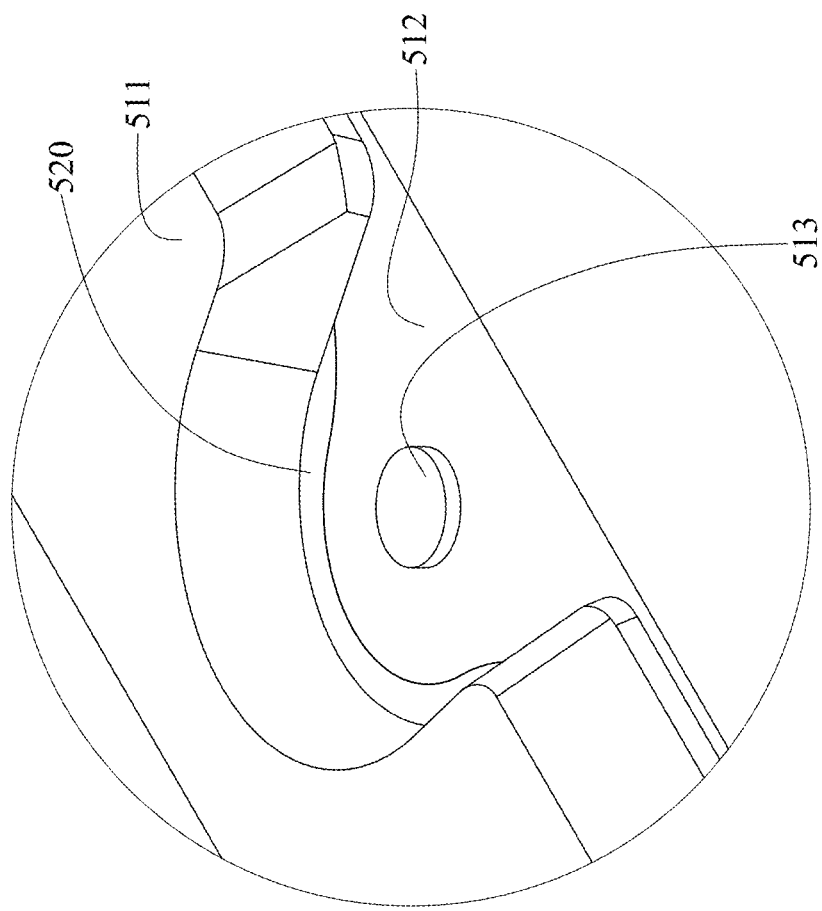
Figure 8:
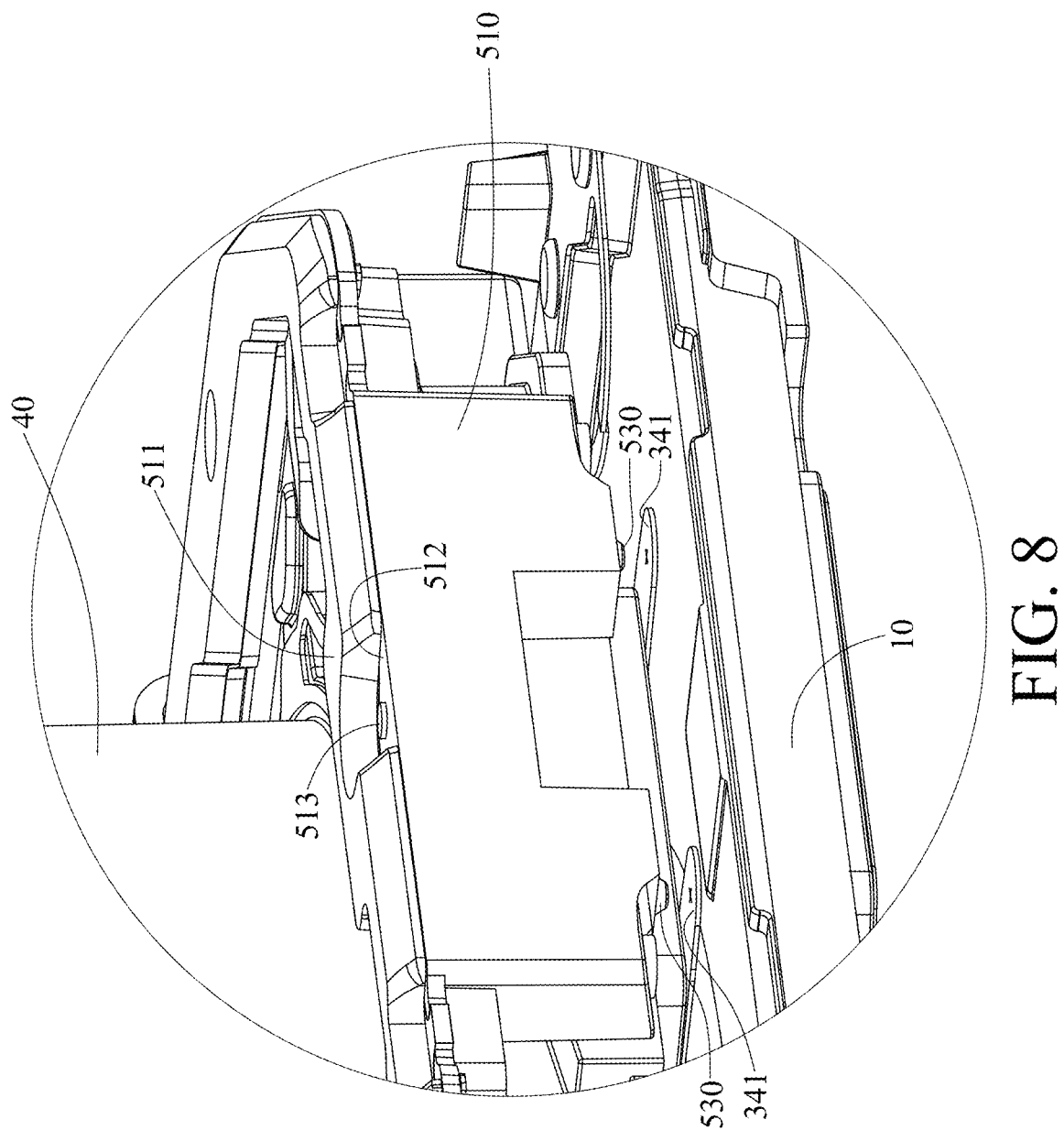

Further referring FIG. 5 to FIG. 8, where FIG. 5 is a partially sectioned view of the lens driving module in FIG. 3, and FIG. 6 to FIG. 8 are partially enlarged views of the lens driving module in FIG. 5. The damping elements 60 are connected to the pins 521 of the space maintaining element 50 and the lens unit 40. In detail, the lens unit 40 includes notch structures 410 extending toward the base 10. The notch structures 410 and the expansion portions 220 of the shield can 20 correspond to each other, and the notch structures 410 are exposed to the object side of the lens unit 40 by the expansion portions 220. As shown in FIG. 2, the lens unit 40 is viewed from its object side toward image side, and the notch structures 410 and the damping elements 60 disposed in the notch structures 410 are visible via the expansion portions 220. The pins 521 of the space maintaining element 50 are in contact with the damping elements 60, but not in direct contact with the lens unit 40.

The space maintaining element 50 further includes bump structures 530. The bump structures 530 and the plastic frame portion 510 are made of one-piece, and the bump structures 530 extend toward the base 10. The lower elastic element 340 of the driving mechanism 30 includes a plurality of extension portions 341 extending away from the optical axis L in a direction perpendicular to the optical axis L, and the extension portions 341 are in physical contact with the space maintaining element 50. The coils 320 and the extension portions 341 of the driving mechanism 30 are alternatively disposed in a circumferential direction D surrounding the optical axis L. The bump structures 530 of the space maintaining element 50 and the extension portions 341 of the driving mechanism 30 correspond to each other so as to constitute a stopper mechanism to restrict movement of the driving mechanism 30 in the direction parallel to the optical axis L. Further, the bump structures 530 and the extension portions 341 are overlapped with each other in the direction parallel to the optical axis L, and the bump structures 530 and the magnets 310 are alternatively disposed in the circumferential direction D surrounding the optical axis L.

The plastic frame portion 510 of the space maintaining element 50 includes a connection surface 511 and step surfaces 512. The connection surface 511 is located on an object-side surface of the plastic frame portion 510, and the connection surface 511 is connected to and in physical contact with the shield can 20. The step surfaces 512 are located closer to the base 10 than the connection surface 511, and parts of the metal structure portion 520 located in areas of the step surfaces 512 are exposed to air. The plastic frame portion 510 of the space maintaining element 50 further includes gate traces 513 located on the step surfaces 512.

Figure 9:
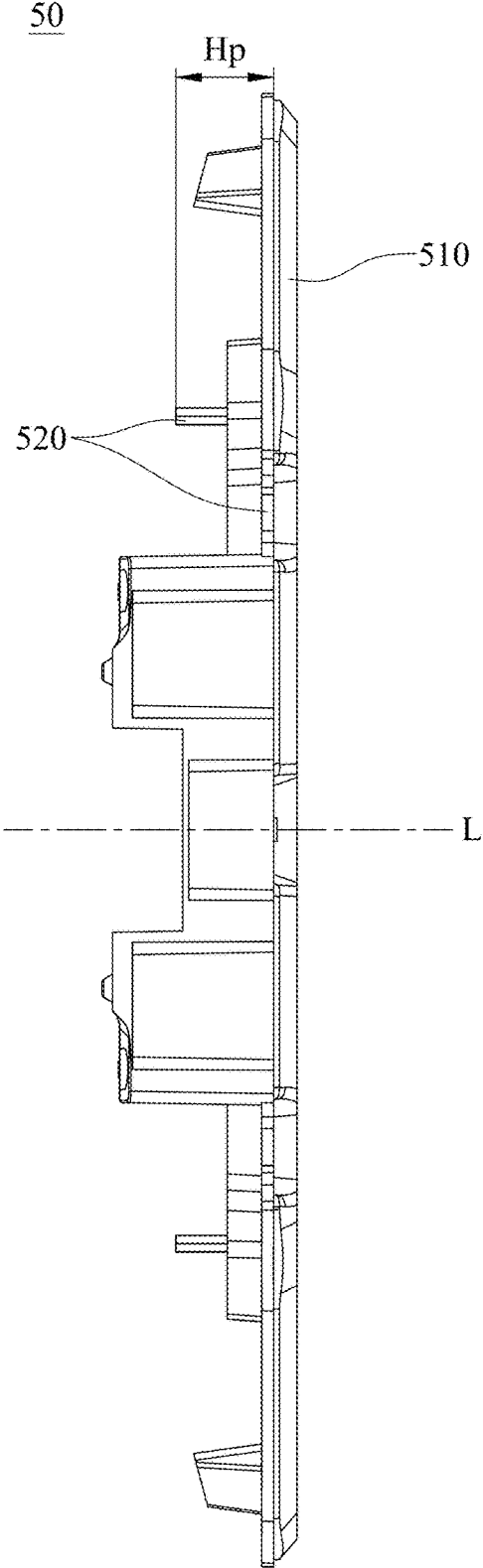
FIG. 9 and FIG. 10 are side views of a space maintaining element of the lens driving module in FIG. 3.
Figure 10:
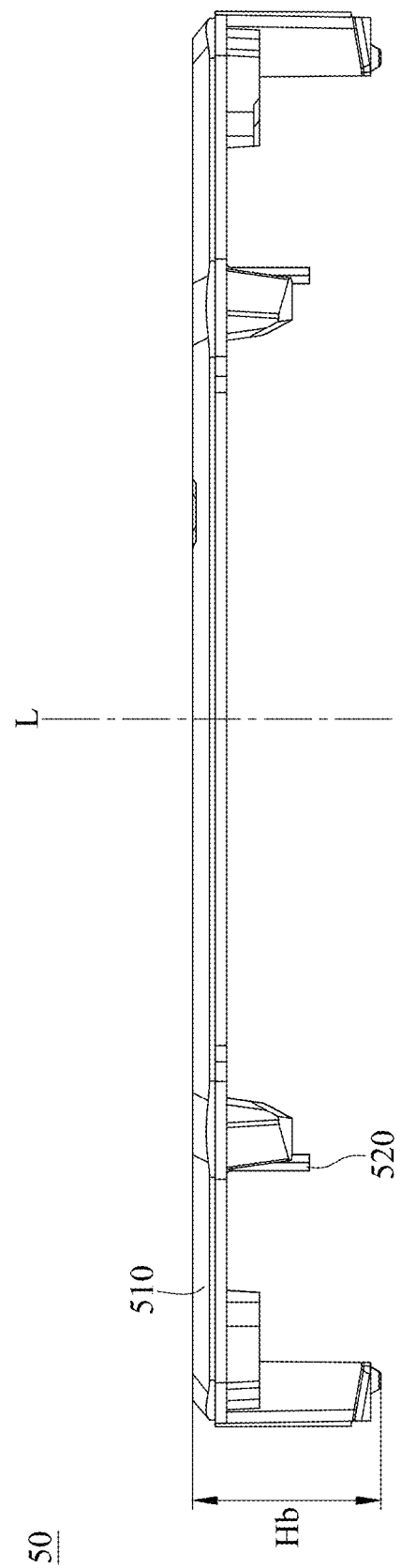

FIG. 9 and FIG. 10 are side views of a space maintaining element of the lens driving module in FIG. 3. When a height of the plastic frame portion 510 in the direction parallel to the optical axis L is Hb, and a height of the metal structure portion 520 in the direction parallel to the optical axis L is Hp, the following conditions are satisfied: Hp=0.83 millimeters (mm); and Hb=1.66 mm.

When the height of the plastic frame portion 510 in the direction parallel to the optical axis L is Hb, and a height of the magnets 310 in the direction parallel to the optical axis L is Hm, the following condition is satisfied: Hb/Hm=1.17.

2nd Embodiment

Figure 11:
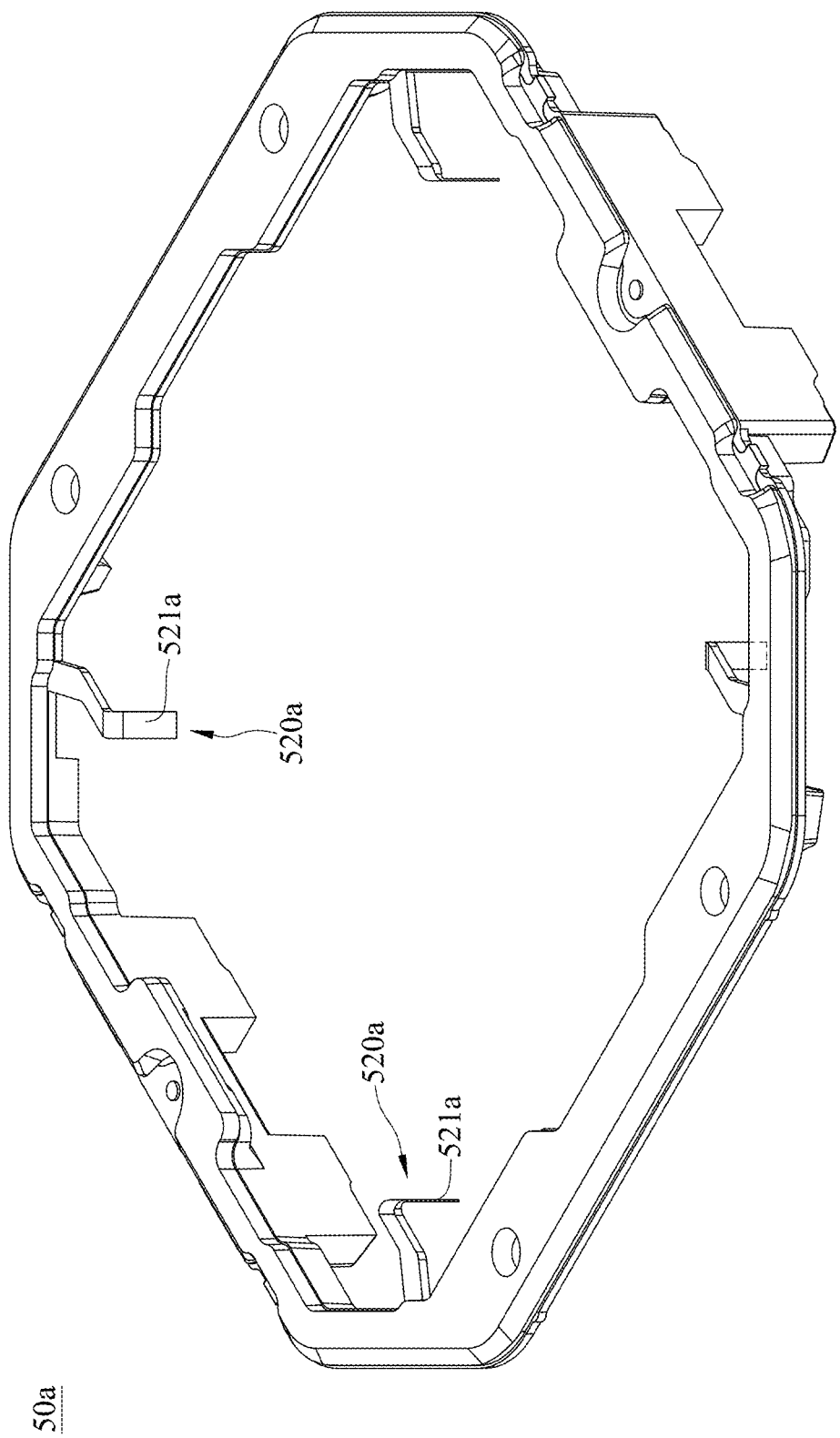
FIG. 11 is a perspective view of a space maintaining element of a lens driving module according to the 2nd embodiment of the present disclosure.

FIG. 11 is a perspective view of a space maintaining element of a lens driving module according to the 2nd embodiment of the present disclosure. In this embodiment, the space maintaining element 50a has similar configuration to the space maintaining element 50 in the 1st embodiment, except that the metal structure portion 520a of the space maintaining element 50a includes a plurality of pins 521a which have distal ends of flat sheets.

3rd Embodiment

Figure 12:
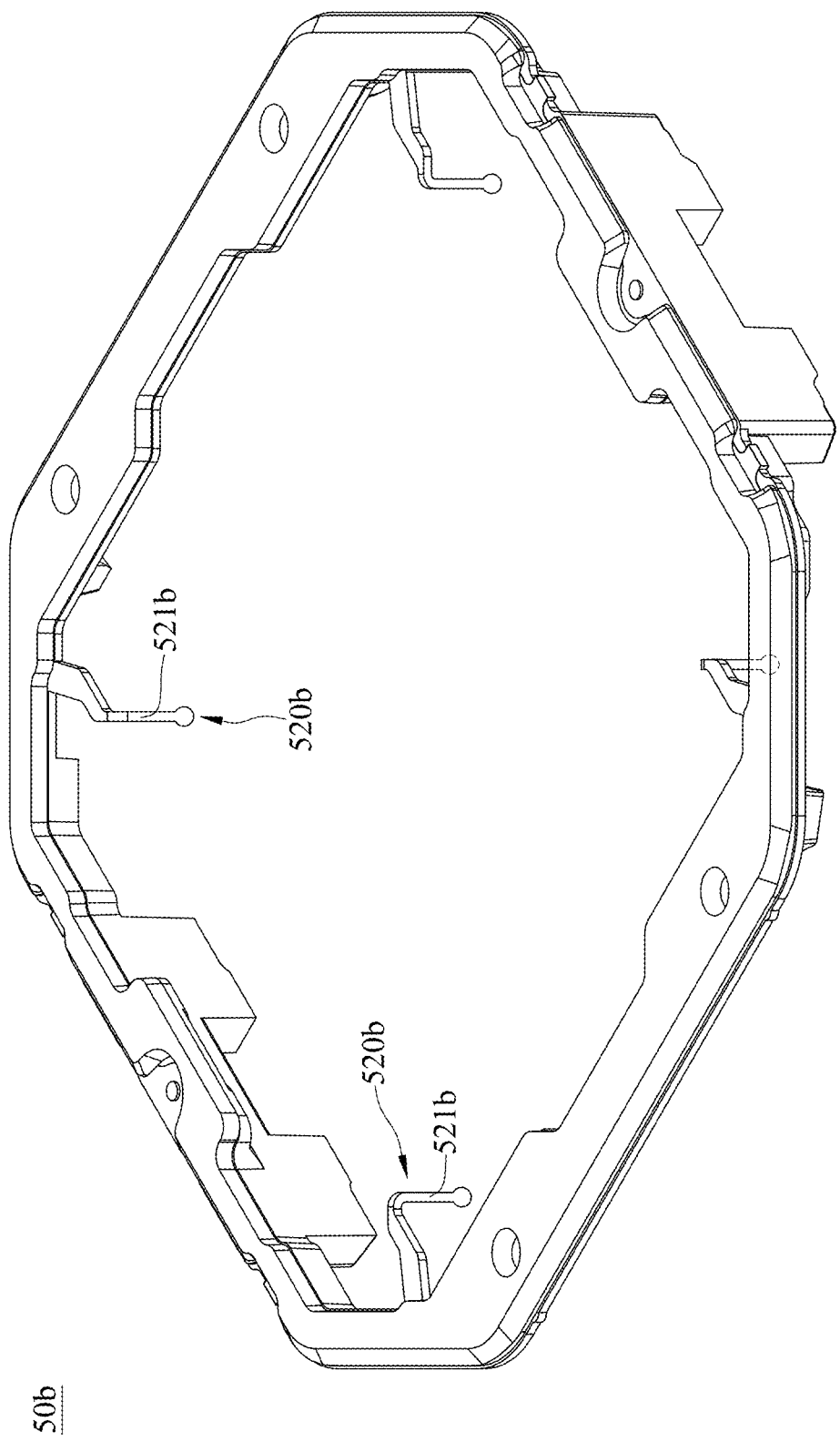
FIG. 12 is a perspective view of a space maintaining element of a lens driving module according to the 3rd embodiment of the present disclosure.

FIG. 12 is a perspective view of a space maintaining element of a lens driving module according to the 3rd embodiment of the present disclosure. In this embodiment, the space maintaining element 50b has similar configuration to the space maintaining element 50 in the 1st embodiment, except that the metal structure portion 520b of the space maintaining element 50b includes a plurality of pins 521b which have distal ends of spheres.

4th Embodiment

Figure 13:
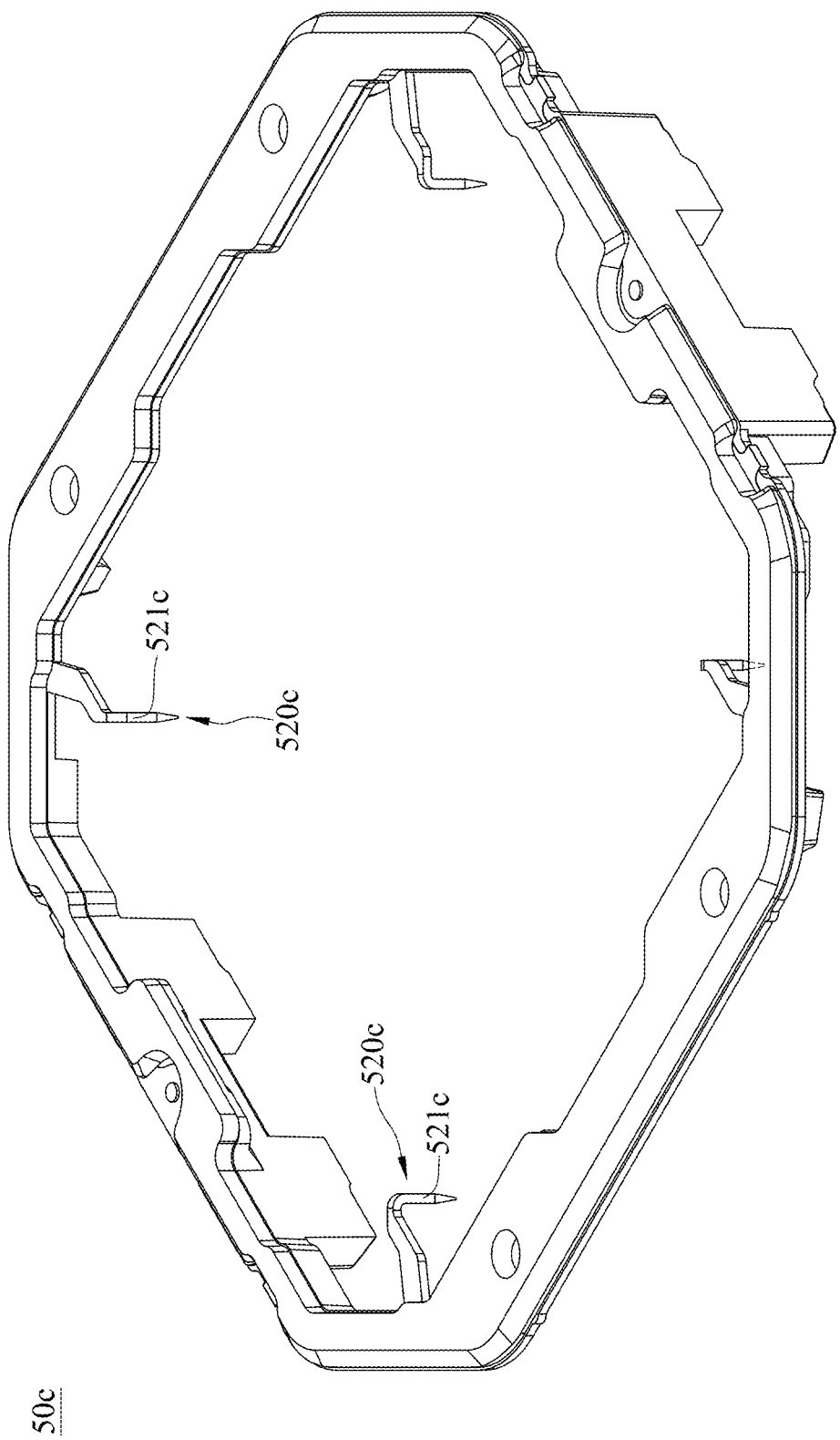
FIG. 13 is a perspective view of a space maintaining element of a lens driving module according to the 4th embodiment of the present disclosure.

FIG. 13 is a perspective view of a space maintaining element of a lens driving module according to the 4th embodiment of the present disclosure. In this embodiment, the space maintaining element 50c has similar configuration to the space maintaining element 50 in the 1st embodiment, except that the metal structure portion 520c of the space maintaining element 50c includes a plurality of pins 521c which have distal ends of pyramids.

5th Embodiment

Figure 14:
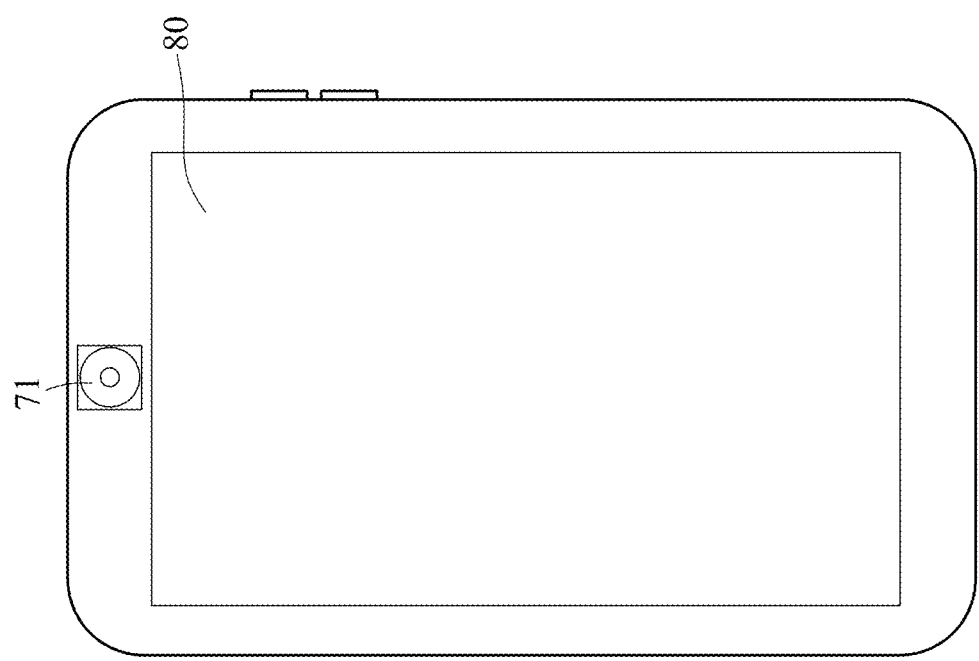
FIG. 14 is a perspective view of an electronic device according to the 5th embodiment of the present disclosure.

FIG. 14 is a perspective view of an electronic device according to the 5th embodiment of the present disclosure. In this embodiment, an electronic device E1 is a smartphone including an image capturing unit 71 and a display unit 80, wherein the image capturing unit 71 includes the lens driving module (not numbered in FIG. 14) disclosed in the 1st embodiment. The image capturing unit 71 and the display unit 80 are disposed on the same side of the electronic device E1, such that the image capturing unit 71 can be front-facing camera of the electronic device E1 for taking selfies, but the present disclosure is not limited thereto.

6th Embodiment

Figure 15:
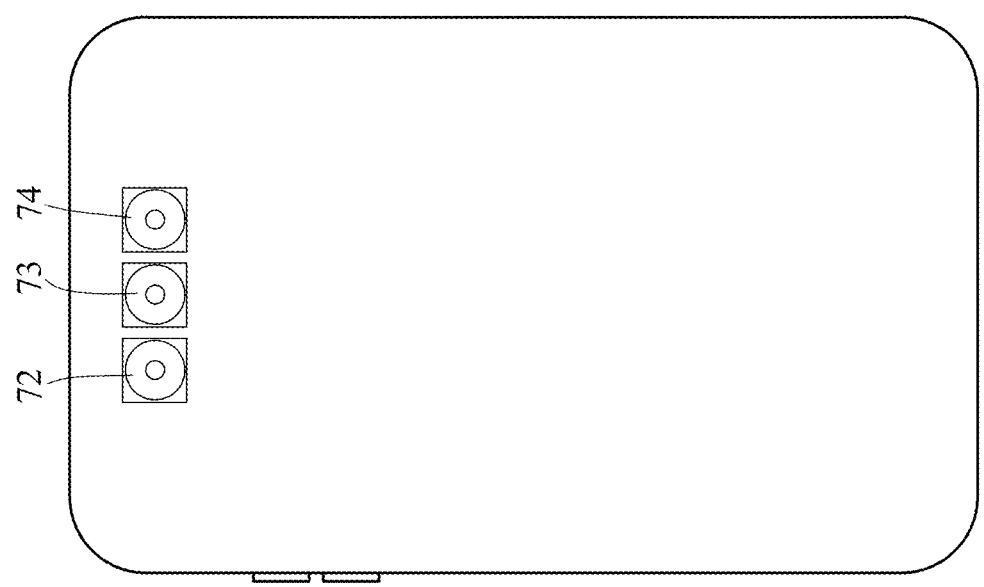
FIG. 15 is a perspective view of an electronic device according to the 6th embodiment of the present disclosure.

FIG. 15 is a perspective view of an electronic device according to the 6th embodiment of the present disclosure. In this embodiment, an electronic device E2 is a smartphone including the image capturing unit 72, an image capturing unit 73, an image capturing unit 74 and a display unit (not shown).

In this embodiment, the image capturing units 72, 73 and 74 have different fields of view (e.g., the image capturing unit 72 is a telephoto image capturing unit, the image capturing unit 73 is a standard image capturing unit, and the image capturing unit 74 is a wide-angle image capturing unit), such that the electronic device E2 has various magnification ratios so as to meet the requirement of optical zoom functionality. At least one of the image capturing units 72, 73 and 74 includes the lens driving module (not numbered in FIG. 15) disclosed in the 1st embodiment and an image sensor (not shown). The image capturing units 72, 73 and 74 are disposed on the same side of the electronic device E2, and the display unit is disposed on another side of the electronic device E2.

7th Embodiment

Figure 16:
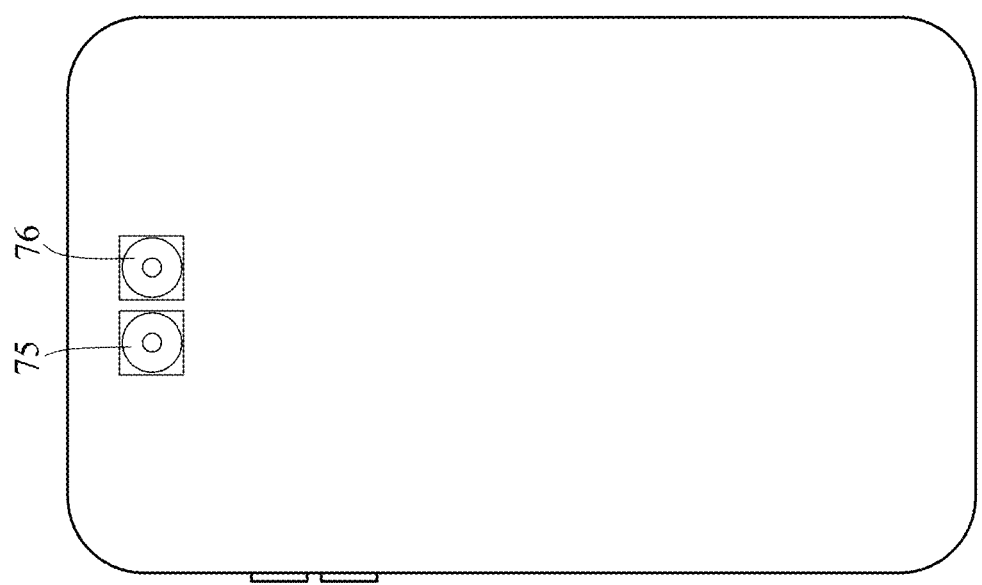
FIG. 16 is a perspective view of an electronic device according to the 7th embodiment of the present disclosure.

FIG. 16 is a perspective view of an electronic device according to the 7th embodiment of the present disclosure. In this embodiment, an electronic device E3 is a smartphone including the image capturing unit 75, an image capturing unit 76 and a display unit (not shown).

In this embodiment, the image capturing units 75 and 76 have different fields of view (e.g., the image capturing unit 75 is a wide-angle image capturing unit, and the image capturing unit 76 is a standard image capturing unit), such that the electronic device E3 has various magnification ratios so as to meet the requirement of optical zoom functionality. At least one of the image capturing units 75 and 76 includes the lens driving module (not numbered in FIG. 16) disclosed in the 1st embodiment and an image sensor (not shown). The image capturing units 75 and 76 are disposed on the same side of the electronic device E3, and the display unit is disposed on another side of the electronic device E3.

The smartphone in this embodiment is only exemplary for showing the lens driving module of the present disclosure installed in an electronic device, and the present disclosure is not limited thereto. The lens driving module can be optionally applied to optical systems with a movable focus. Furthermore, the lens driving module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A lens driving module, comprising:
a shield can;
a driving mechanism, disposed in the shield can, wherein the driving mechanism is configured to drive a lens unit to move in a direction parallel to an optical axis of the lens unit;
a space maintaining element in physical contact with the shield can, wherein the space maintaining element is configured to space the driving mechanism apart from a central aperture of the shield can by a predetermined distance in the direction parallel to the optical axis, and the space maintaining element comprises:
a plastic frame portion; and
a metal structure portion, comprising a plurality of pins, wherein the metal structure portion is insert-molded with the plastic frame portion to form the space maintaining element; and
a damping element, connected to the plurality of pins and the lens unit;
wherein the plurality of pins are located closer to the optical axis than part of the metal structure portion without the plurality of pins.

2. The lens driving module of claim 1, wherein the driving mechanism comprises:
at least one magnet;
at least one coil, corresponding to the at least one magnet, wherein the lens unit is movable in the direction parallel to the optical axis by a magnetic force generated by an interaction between the at least one magnet and the at least one coil, and one of the at least one magnet and the at least one coil is disposed on the lens unit; and
at least one elastic element, coupled to the lens unit.

3. The lens driving module of claim 2, wherein a number of the at least one elastic element is two, the two elastic elements are an upper elastic element and a lower elastic element, the upper elastic element is disposed on an object side of the lens unit, the lower elastic element is disposed on an image side of the lens unit, and the lower elastic element and the upper elastic element are disposed opposite to each other.

4. The lens driving module of claim 3, wherein the lower elastic element comprises an extension portion extending away from the optical axis in a direction perpendicular to the optical axis.

5. The lens driving module of claim 4, wherein the at least one coil and the extension portion are alternatively disposed in a circumferential direction surrounding the optical axis.

6. The lens driving module of claim 4, wherein the space maintaining element further comprises at least one bump structure disposed on an image-side surface of the plastic frame portion, and the at least one bump structure extends away from the central aperture of the shield can and corresponds to the extension portion of the lower elastic element so as to restrict movement of the driving mechanism in the direction parallel to the optical axis.

7. The lens driving module of claim 6, wherein the at least one bump structure and the extension portion of the lower elastic element are overlapped with each other in the direction parallel to the optical axis.

8. The lens driving module of claim 7, wherein the plastic frame portion and the at least one bump structure are made in one-piece.

9. The lens driving module of claim 1, wherein the shield can further comprise an expansion portion connected to the central aperture and extending away from the central aperture, the lens unit comprises a notch structure extending away from the central aperture of the shield can and corresponding to the expansion portion, and the notch structure is exposed to an object side of the lens unit by the expansion portion.

10. The lens driving module of claim 9, wherein the damping element is disposed in the notch structure.

11. The lens driving module of claim 1, wherein a height of the plastic frame portion in the direction parallel to the optical axis is Hb, a height of the metal structure portion in the direction parallel to the optical axis is Hp, and the following condition is satisfied:

$Hp<Hb$.

12. The lens driving module of claim 11, wherein the driving mechanism comprises at least one magnet, the height of the plastic frame portion in the direction parallel to the optical axis is Hb, a height of the at least one magnet in the direction parallel to the optical axis is Hm, and the following condition is satisfied:

$0.7<Hb/Hm<1.3$.

13. The lens driving module of claim 1, wherein the plastic frame portion of the space maintaining element comprises:
   a connection surface, located on an object-side surface of the plastic frame portion, wherein the connection surface is connected to and in physical contact with the shield can; and
   a step surface, located farther away from the central aperture of the shield can than the connection surface, and part of the metal structure portion located in an area of the step surface is exposed to air.

14. The lens driving module of claim 13, wherein the plastic frame portion comprises at least one gate trace located on the step surface.

15. An electronic device, comprising the lens driving module of claim 1.

16. A lens driving module, comprising:
   a shield can;
   a driving mechanism, disposed in the shield can, wherein the driving mechanism is configured to drive a lens unit to move in a direction parallel to an optical axis of the lens unit; and
   a space maintaining element in physical contact with the shield can, wherein the space maintaining element is configured to space the driving mechanism apart from a central aperture of the shield can by a predetermined distance in the direction parallel to the optical axis, and the space maintaining element comprises:
      a plastic frame portion in direct contact with the shield can; and
      a bump structure, extending away from the central aperture of the shield can;
   wherein the driving mechanism comprises:
      at least one magnet;
      at least one coil, corresponding to the at least one magnet, wherein the lens unit is movable in the direction parallel to the optical axis by a magnetic force generated by an interaction between the at least one magnet and the at least one coil, and one of the at least one magnet and the at least one coil is disposed on the lens unit; and
      a lower elastic element, coupled to the lens unit, wherein the lower elastic element is disposed on an image side of the lens unit and comprises an extension portion extending away from the optical axis in a direction perpendicular to the optical axis;
   wherein the bump structure of the space maintaining element corresponds to the extension portion of the lower elastic element, and the bump structure and the at least one magnet are alternatively disposed in a circumferential direction surrounding the optical axis.

17. The lens driving module of claim 16, wherein the bump structure and the extension portion constitute a stopper mechanism of the lens driving module, the stopper mechanism is configured to restrict movement of the driving mechanism in the direction parallel to the optical axis.

18. The lens driving module of claim 16, wherein plastic frame portion of the space maintaining element comprises:
   a connection surface, located on an object-side surface of the plastic frame portion, wherein the connection surface is connected to and in physical contact with the shield can; and
   a step surface, located farther away from the central aperture of the shield can than the connection surface; and
   at least one gate trace, located on the step surface.

19. The lens driving module of claim 16, wherein the at least one coil and the extension portion are alternatively disposed in the circumferential direction surrounding the optical axis.

* * * * *